United States Patent
Rigolone et al.

(10) Patent No.: US 9,085,031 B2
(45) Date of Patent: Jul. 21, 2015

(54) THREAD WHIRLING DEVICE AND TURNING MACHINE COMPRISING A THREAD WHIRLING DEVICE

(71) Applicant: GILDEMEISTER ITALIANA S.P.A., Brembate di Sopra (BG) (IT)

(72) Inventors: Franco Rigolone, Ponteranica (IT); Renato Rota, Carvico (IT); Marco Cavadini, Suisio (IT); Luca Milesi, San Giovanni Bianco (IT)

(73) Assignee: GILDEMEISTER ITALIANA S.P.A., Brembate di Sopra (bg) (IT)

( * ) Notice: Subject to any disclaimer, the term of this patent is extended or adjusted under 35 U.S.C. 154(b) by 0 days.

(21) Appl. No.: 14/345,631

(22) PCT Filed: Sep. 18, 2012

(86) PCT No.: PCT/EP2012/068374
§ 371 (c)(1),
(2) Date: Mar. 18, 2014

(87) PCT Pub. No.: WO2013/038028
PCT Pub. Date: Mar. 21, 2013

(65) Prior Publication Data
US 2014/0318330 A1      Oct. 30, 2014

(30) Foreign Application Priority Data

Sep. 18, 2011  (DE) .......................... 10 2011 082 903

(51) Int. Cl.
| | |
|---|---|
| *B23G 1/34* | (2006.01) |
| *B23G 3/00* | (2006.01) |
| *B23B 11/00* | (2006.01) |
| *B23B 25/00* | (2006.01) |
| *B23B 5/46* | (2006.01) |

(52) U.S. Cl.
CPC . *B23B 5/46* (2013.01); *B23B 11/00* (2013.01); *B23B 25/00* (2013.01); *B23G 1/34* (2013.01); *B23G 3/00* (2013.01); *B23B 2215/68* (2013.01); *B23B 2220/52* (2013.01); *B23G 2240/40* (2013.01); *B23G 2240/60* (2013.01); *Y10T 82/2502* (2015.01); *Y10T 82/2527* (2015.01)

(58) Field of Classification Search
CPC ..................... B23C 2210/503; B23C 2200/68; B23G 5/18; B23Q 5/046
USPC .......................... 409/74, 65; 29/27 C; 470/10
See application file for complete search history.

(56) References Cited

U.S. PATENT DOCUMENTS

| | | | | |
|---|---|---|---|---|
| 8,549,964 | B2 * | 10/2013 | Fujimoto et al. ................ | 82/124 |
| 8,961,081 | B2 * | 2/2015 | Ronald et al. ..................... | 409/8 |
| 2004/0081519 | A1 * | 4/2004 | Gainer ............................ | 407/49 |
| 2006/0218764 | A1 * | 10/2006 | Hashimoto et al. ........... | 29/27 C |
| 2008/0131224 | A1 * | 6/2008 | Vouillamoz ..................... | 409/74 |

FOREIGN PATENT DOCUMENTS

| | | |
|---|---|---|
| DE | 10 2004 009 088 A1 | 6/2005 |
| EP | 1 985 397 A2 | 10/2008 |

OTHER PUBLICATIONS

Search Report issued in German Application No. 10 2011 082 903.2 dated Jun. 26, 2012 (with partial translation).
International Search Report issued in International Application No. PCT/EP2012/068374 dated Jan. 10, 2013.
English-language translation of International Preliminary Report on Patentability issued in International Application No. PCT/EP2012/068374 dated Mar. 18, 2014.

\* cited by examiner

*Primary Examiner* — Will Fridie, Jr.
(74) *Attorney, Agent, or Firm* — Oliff PLC

(57) ABSTRACT

A thread whirling device for producing a thread on a workpiece on a numerically controlled turning machine by a thread whirling method, having a retention structure for fitting the thread whirling device to the turning machine, a whirling head which is retained on the retention structure, has an opening and carries one or more cutters which are arranged peripherally on the edge of the opening, having a first drive device which is configured to drive the whirling head in a rotational manner about a first rotation axis which extends through the opening. The thread whirling device further includes a second drive device which is configured to drive the whirling head in a rotational manner about a second rotation axis which extends transversely relative to the first rotation axis, in order to orientate an angle between the first rotation axis and the spindle axis of the turning machine work spindle.

24 Claims, 5 Drawing Sheets

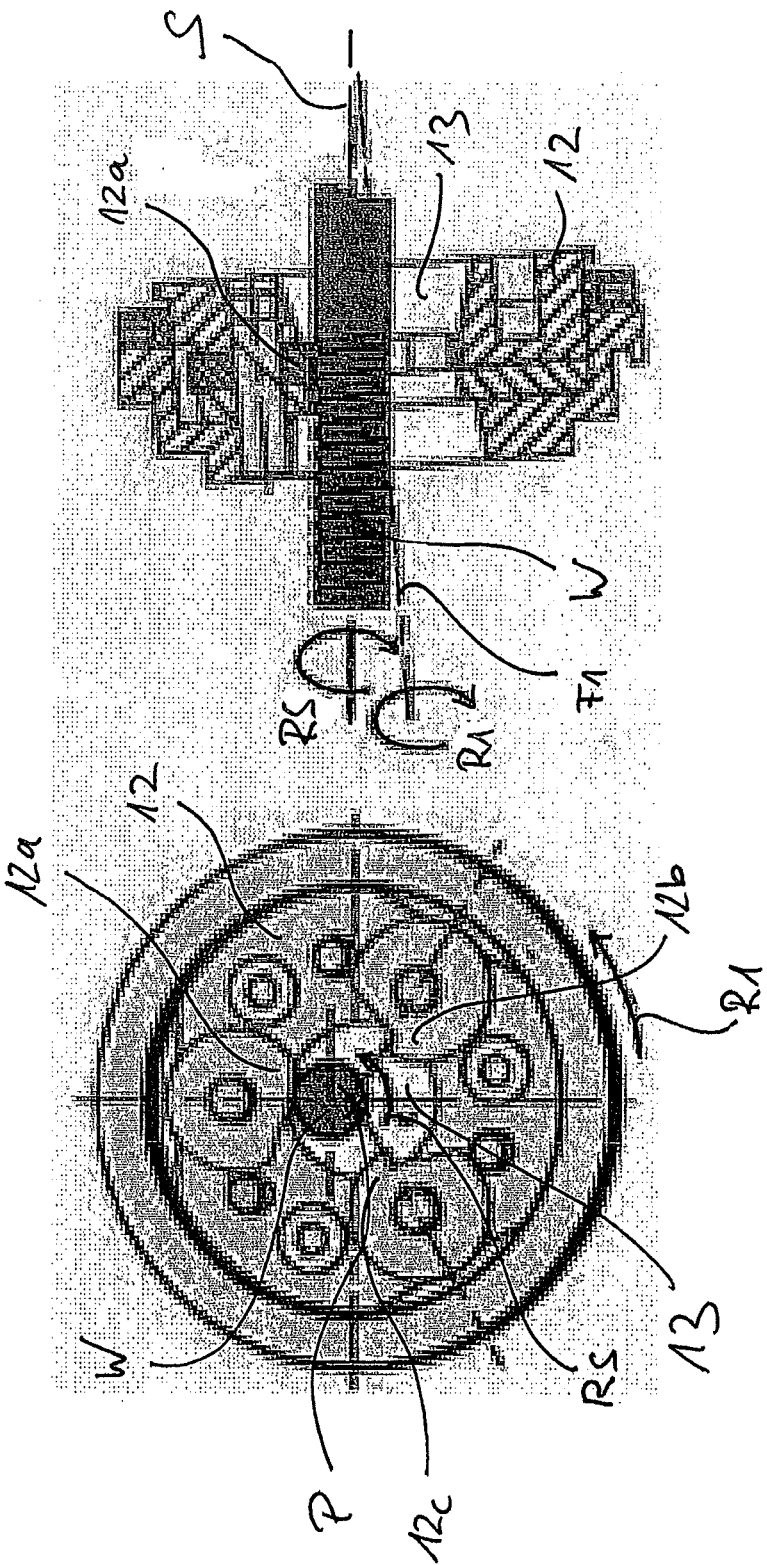

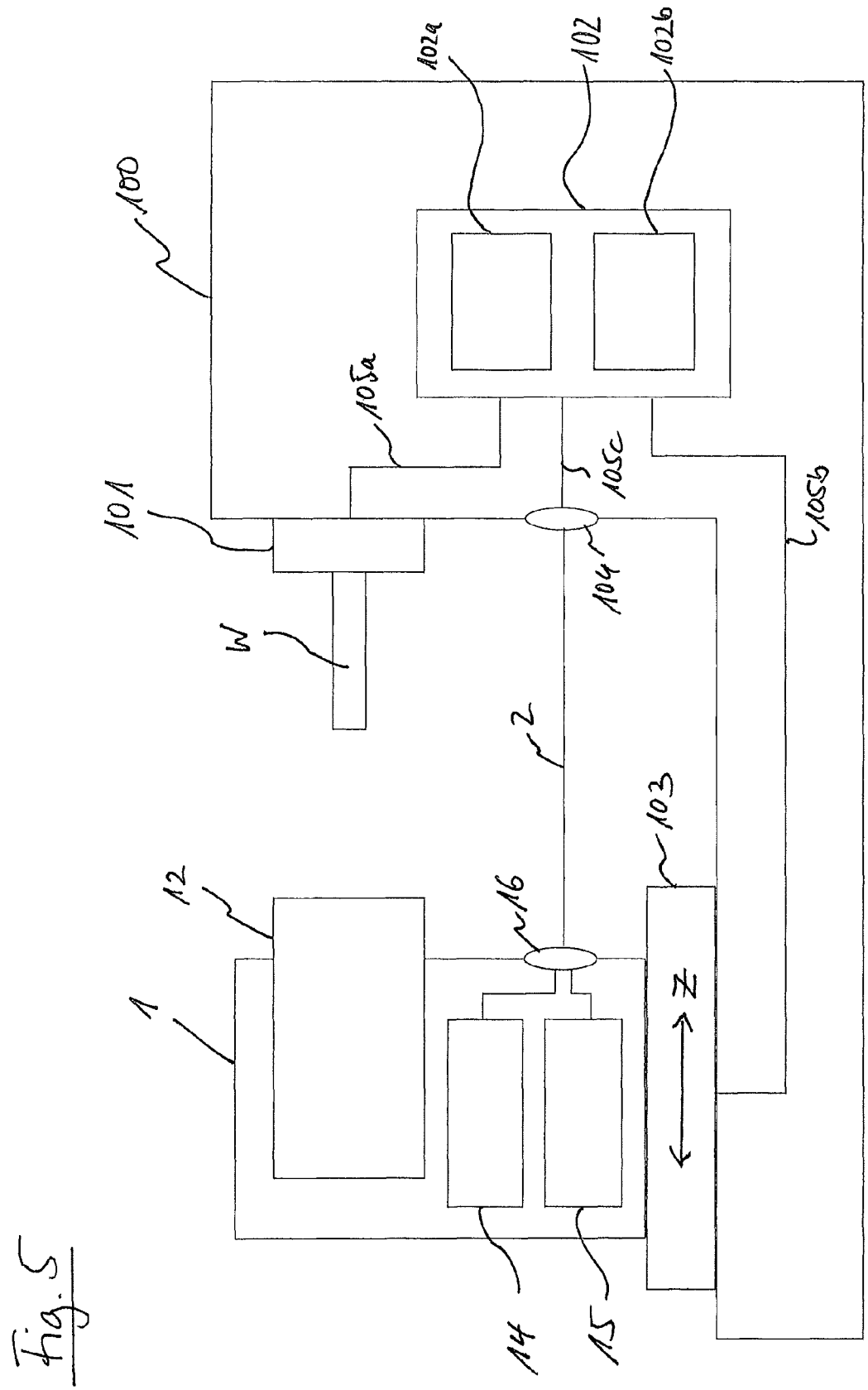

THREAD WHIRLING DEVICE AND TURNING MACHINE COMPRISING A THREAD WHIRLING DEVICE

The present invention relates to a thread whirling device for producing a thread on a workpiece on a numerically controlled turning machine by means of a thread whirling method, having a retention structure for fitting the thread whirling device to the turning machine, having a whirling head which is retained on the retention structure and which has an opening and which carries one or more cutters which are arranged peripherally on the edge of the opening, and having a first drive means which is configured to drive the whirling head in a rotational manner about a first rotation axis which extends through the opening. In addition, the present invention relates to a numerically controlled turning machine having an work spindle for receiving a workpiece and for rotationally driving the workpiece about a spindle axis of the work spindle and a thread whirling device.

BACKGROUND OF THE INVENTION

A generic thread whirling device according to the preamble of claim 1 is known from EP 1 985 397 A2. Generic thread whirling devices are configured to carry out the thread whirling method in which the workpiece is driven in a rotational manner about the spindle axis of the work spindle by means of an work spindle of the turning machine, whilst the workpiece extends through the opening of the whirling head, the whirling head is driven in a rotational manner about the first rotation axis by the first drive means in order to produce a cutting movement, and the workpiece is controlled by means of a control device of the turning machine in such a manner that it moves relative to the whirling head in the direction of the spindle axis, the feed speed of the workpiece relative to the whirling head in the direction of the spindle axis and the rotation speed of the workpiece about the spindle axis being adapted to each other in accordance with a thread profile to be formed.

The thread whirling of threads is particularly advantageous in the field of medical technology, in particular in the production of implants for surgery, such as, for example, self-locking bone screws having special threads. Such screws or elements having special threads are required, for example, for implants in the field of dental medicine, in spinal column implants and in the field of orthopaedic surgery as bone screws. In this instance, the great advantage of the thread whirling is that it enables workpieces to be processed from stainless and tough steel and from titanium and titanium alloys in a relatively simple manner and with the high degree of precision required.

The whirled thread profile is absolutely burr-free—an extremely important requirement for medical technology—and is distinguished by a high surface quality and shape accuracy. During the thread whirling operation, the thread can further be cut into the solid material in one operation so as to save time, whereby a high degree of measurement accuracy can be achieved. The precision is in the tolerance range of a few hundredths of a millimeter and can be achieved only by precise correspondence of the parameters of speed of the work spindle and feed motion of the whirling head relative to the work spindle.

The generic thread whirling device as a tool for thread whirling comprises, for example, the whirling head for example having a plurality of solid carbide cutters or thread turning chisels for thread whirling, which are arranged peripherally around the opening of the whirling head. For the desired thread profile, for example a specific cutter profile is calculated and specifically produced for this desired thread.

The whirling head or the rotation axis thereof, in order to produce the cutting movement, is then inclined with respect to the spindle axis at the pitch angle of the thread to be cut.

Subsequently, the workpiece is pushed between the cutters of the whirling head into the opening, only one cutter being used in most cases. The whirling head rotates at high speed during the thread whirling operation and consequently determines the cutting speed, and the workpiece rotates at a low spindle speed and is located in the direction of the spindle axis during linear axis operation of the turning machine and determines the feed motion in the direction of the spindle axis, or the thread pitch. In particular, the correspondence of the feed speed and speed of the spindle influences the thread pitch of the thread.

The spindle speeds, in thread whirlers for threads for medical technology, are mostly in the range of approximately from 15 to 20 rpm, the feed speed then being intended to be adjusted in accordance with the desired thread pitch, that is to say precisely by one pitch per rotation of the spindle (in threads, the pitch characterises the lead, that is to say the spacing between two thread stages along the thread axis, or in other words the axial path which is travelled by one rotation of the thread).

In generic thread whirling devices, a drive means can be provided on the thread whirling device, by means of which drive means the rotation movement of the whirling head can be driven at high speed in order to produce the cutting movement. This drive means can be provided either as an indirect drive or as a direct drive, as advantageously taught in EP 1 985 397 A2.

However, with generic thread whirling devices there is always provision for the inclination angle of the whirling head which, in order to achieve the precision of the thread required for medical technology, has to be adjusted precisely to the desired thread pitch of the desired thread profile, to have to be adjusted in a manual manner. In order to even enable the required precision in this adjustment of the inclination angle by means of manual adjustment, it is necessary to provide complex and disadvantageously large translation mechanisms which can translate manual adjustment movements into minimal adjustment movements. Furthermore, the advantage of the extremely rapid processing of the workpiece in order to form the thread by the method of thread whirling is again invalidated by the above lengthy manual adjustment procedure.

In most cases, screws for medical technology are not mass-produced articles, but instead individually produced workpieces so that in practice, often before the processing of each individual workpiece, such a lengthy manual adjustment is required. This is even the case when, for a series of workpieces, workpieces having the same thread profile and the same thread pitch but different nominal diameters are intended to be thread whirled one after the other or even when, for a series of workpieces, workpieces having the same thread profile and the same nominal diameter but different thread pitches are intended to be thread whirled one after the other.

According to US 200810131224A1, a thread whirling head is known which can be fitted to a tool-carrying spindle of a milling processing centre and which has a thread cutter which is driven by means of the spindle drive. In this instance, the axes of the processing centre which can be travelled in order to move the spindle retaining the thread whirling head are used to control the movements of the thread whirling head relative to a workpiece which is clamped on a tool clamp in a translatory manner in three degrees of freedom and in one degree of freedom in a rotational manner with respect to a workpiece axis. In this instance, however, there is also the disadvantage that a spindle or a spindle drive of the processing centre has to be used to drive the thread whirling head and axes of the processing centre have to be used to control the thread whirling head since the thread whirling head has no separate drive means at all. In addition, such a thread whirling head is not suitable for use on a turning machine having a workpiece-carrying spindle since the spindle of a turning machine is configured to receive the workpiece (workpiece-carrying spindle in contrast to a workpiece-carrying spindle of a milling machine or a processing centre), and the thread whirling head consequently cannot be received on the spindle of the turning machine and consequently cannot be driven by means of the spindle.

With regard to these above-described disadvantages of generic thread whirling devices, an object of the present invention is to provide a thread whirling device which enables the thread whirling of medical workpieces to be configured in a more efficient and simpler manner, with the high degree of precision required in medical technology being maintained or even improved, in particular when different workpieces are processed one after the other.

SUMMARY OF THE INVENTION

In order to achieve the above-mentioned object of the present invention, according to the invention a thread whirling device according to claim 1 and a numerically controlled turning machine according to claim 18 are proposed. The dependent claims relate to preferred embodiments of the present invention.

According to a first aspect of the present invention, there is proposed a thread whirling device which can be fitted to a numerically controlled turning machine for producing a thread on a workpiece, which is received on a workpiece-carrying spindle, on the numerically controlled turning machine by means of a thread whirling method, comprising the following: a retention structure which is in particular constructed in one piece or a plurality of pieces for fitting the thread whirling device to the turning machine (in particular to a tool carrier of the turning machine or to a machine body of the turning machine), a whirling head which is retained on the retention structure, is in particular rotatably supported and has an opening and carries one or more cutters which are arranged peripherally on the edge of the opening, and a first drive means which is configured to drive the whirling head in a rotational manner about a first rotation axis (in particular independently of a spindle of the turning machine or independently of a spindle drive of the turning machine) which extends through the opening by means of which there is also provision for the workpiece to be introduced for the thread whirling operation in such a manner that the thread can be formed by means of the cutters during rotation of the whirling head in order to produce the cutting movement. In this instance, the retention structure for fitting the thread whirling device to the turning machine is in particular constructed as a retention structure which can be secured in a releasable manner and which can be secured to a tool carrier of the turning machine or to a machine body of the turning machine so as to be able to be locked and unlocked.

The thread whirling device according to the invention, when cooperating with the turning machine, when it is fitted and in particular secured or locked thereto (in particular to a workpiece carrier or to a machine body of the turning machine), is configured to carry out the thread whirling method in which the workpiece is driven in a rotational manner about the spindle axis of the work spindle by means of the tool-carrying work spindle of the turning machine, whilst the workpiece extends through the opening of the whirling head, the whirling head, in order to produce a cutting movement, is driven rotationally about the first rotation axis by means of the first drive means which is provided separately on or in the thread whirling device, in particular by means of the first drive means which is integrated in the thread whirling device, and the workpiece is controlled by means of a control device of the turning machine in such a manner that it moves relative to the whirling head in the direction of the spindle axis (in particular independently of a spindle of the turning machine or independently of a spindle drive of the turning machine and also independently of any rotary axis drives of the turning machine).

The feed speed of the workpiece relative to the whirling head in the direction of the spindle axis and the rotation speed of the workpiece about the spindle axis in accordance with the thread to be formed (in particular in accordance with the thread pitch) are in this instance preferably adjusted with respect to each other in accordance with the thread to be formed. In particular, the thread whirling device is preferably configured to produce the cutting movement for the thread whirling method by means of the first drive means which is provided separately on or in the thread whirling device by driving the rotation of the whirling head.

The thread whirling device according to the Invention further comprises, according to the invention, a second drive means which is provided separately on or in the thread whirling device, in particular a second drive means which is integrated in the thread whirling device and which is configured to drive the whirling head in a rotational manner about a second rotation axis which extends transversely relative to the first rotation axis, to orientate an angle between the first rotation axis and the spindle axis (in particular independently of a spindle of the turning machine or independently of a spindle drive of the turning machine and also independently of any rotation axis drives of the turning machine) when the thread whirling device is fitted to the turning machine.

The notion of the invention is consequently to provide, in addition to the first drive means which is provided separately on or in the thread whirling device and which, in order to produce the cutting movement, drives the whirling head about the first rotation axis in a rotational manner at high speeds which are required for the cutting movement (independently of the spindle or the spindle drive of the turning machine), another second drive means which is provided separately on or in the thread whirling device and which can rotate the whirling head about another second rotation axis (independently of the spindle or the spindle drive of the turning machine and independently of any rotation axis drives of the turning machine) so that the required adjustment of the inclination angle of the whirling head or the first rotation axis relative to the spindle axis of the turning machine can now be carried out automatically via the second drive means and no longer has to be carried out manually in a complex and time-intensive mechanical manner, as set out in the prior art.

Advantageously, this not only enables the adjustment procedure to be able to be carried out in a much simpler, more precise and more rapid manner, but advantageously also enables the thread whirling device to be able to be constructed in a more compact manner since it is necessary neither to provide a large scale for reading the adjusted angular position for the manually adjusting operator, nor to provide a complex translation mechanism which translates the manual mechanical adjustment movements of the operator into more precise, actual angular adjustment movements.

The significant improvement relating to the duration of the adjustment, which may be made possible by the invention for the adjustment of the inclination angle, can in this instance be seen not only in that the required time for the actual inclination angle adjustment can be significantly reduced by the automation, but further by the fact that it is no longer necessary—as is still the case with mechanical manual adjustment—for the operator to have to reach into the operating space of the turning machine for the angular adjustment. Because the operating space had to be opened for such manual adjustments to the thread whirling device, it was always necessary for safety reasons to bring the turning machine to an absolute standstill in order to be able to carry out the adjustment, the operating space being able to be opened only when the machine had reached a standstill. However, with the automated adjustment according to the invention using the second drive means, it is advantageously possible to keep the operating space closed and even to carry out other automatic steps on the turning machine at the same time as the adjustment. Thus, it is, for example, advantageously now possible, at the same time as the inclination angle of the whirling head is adjusted, to change the workpiece on the spindle if the turning machine comprises an automatic workpiece changing device, whereby another significant improvement in efficiency is achieved.

Using the second drive means according to the invention, the adjustment possibility of the inclination angle is consequently automated in a particularly advantageous manner and can be carried out in a significantly simpler, significantly more efficient, significantly more precise and significantly more rapid manner and it is further conceivable even to make provision for a continuous subsequent adjustment during the processing of the workpiece, for example in order to compensate for wear of the cutters during thread whirling, in order to enable even higher precision values with respect to the thread over the entire length of the thread.

Preferably, the second rotation axis extends substantially perpendicularly relative to the first rotation axis. This has the advantage that the first rotation axis can be precisely aligned in a plane.

The first rotation axis and the second rotation axis preferably intersect at a common intersection. Preferably, the one or more cutters of the whirling head have a cutting orientation which is orientated for each of the cutters with the common intersection of the first rotation axis and the second rotation axis. This has the additional advantage that the axial movement direction of the relative movement between the spindle and thread whirling device does not have to be adapted to the orientation of the whirling head about the second rotation axis.

The thread whirling device preferably further comprises an interface means which is configured to be connected to the control device of the turning machine, the second drive means preferably being configured to be controlled by the control device of the turning machine by means of the connected interface means. This has the advantage that the control system of the second drive means can be controlled efficiently by means of the same control device as the other functions of the numerically controllable turning machine. In this instance, the control device of the turning machine may in particular comprise a numerical controller (NC) of the turning machine and/or a programmable logic controller (PLC), the interface means then being connected to the numerical controller and/or the programmable logic controller.

The thread whirling device preferably further comprises an interface means which is configured to be connected to an electronic control device, the second drive means preferably being configured to be controlled by the electronic control device by means of the connected interface means.

The thread whirling device preferably further comprises an electronic control device, the second drive means being configured to be controlled by means of the electronic control device. Consequently, a separate electronic control device may be provided. This has the advantage that the thread whirling device according to the invention, in addition to the ability to be used for numerically controlled turning machines, can also be used on mechanical turning machines, or on numerically controlled turning machines which have no functionality for connecting the separate control device to interface means of independent controllable auxiliary units. Preferably, the electronic control device of the thread whirling device comprises an interface means which is configured to be connected to the control device of the turning machine. The control of the turning machine and the control of the thread whirling device can then advantageously be adapted to each other since the control devices can be connected.

The second drive means is preferably configured to be controlled by means of the control device which controls it on the basis of a manual input by a user and/or on the basis of control commands contained in a CNC programme.

Preferably, the second drive means comprises, for rotatably driving the whirling head about the second rotation axis, a highly precise electric motor, in particular preferably a servomotor. This is advantageously configured to drive the second drive means on the basis of precisely adjustable electrical signals and to carry out the adjustment of the angular orientation of the whirling head in a particularly precise and efficient manner.

The second drive means preferably comprises a clamping means, in particular an automatically controllable clamping means, which is configured to secure the angle orientated by means of the second drive means between the first rotation axis and the spindle axis during the thread whirling method. This advantageously enables the adjusted orientation of the angular inclination of the whirling head during the actual thread whirling operation to be able to be secured in order to be able to prevent an adjustment owing to the cutting forces which occur.

Preferably, the second drive means comprises an angular position sensor which is configured to establish an angular position of an orientation of the whirling head with respect to the rotation about the second rotation axis. Preferably, the angular position sensor is, for an adjustment of the second drive means, configured to transmit an output signal which indicates the established angular position to the control device which controls the second drive means. This advantageously enables an even more significantly precise angular adjustment since the angular orientation of the whirling head is not only controlled in an open-loop manner, but can even be controlled in a closed-loop manner by means of a control circuit.

Preferably, the second drive means is configured to orientate the whirling head from a standard orientation up to a first maximum angular orientation in a first rotation direction about the second rotation axis and/or from the standard orientation up to a second maximum angular orientation in a second rotation direction counter to the first rotation direction about the second rotation axis, in particular preferably up to +15° and/or −15° with respect to the standard orientation.

Preferably, the thread whirling device can be fitted to the turning machine in such a manner that the first rotation axis with standard orientation of the whirling head is orientated parallel to, in particular coaxial with, the spindle axis of the turning machine.

The second drive means preferably comprises a gear mechanism. The gear mechanism preferably comprises a bevel gear mechanism, a worm gear mechanism and/or a spur gear mechanism. Depending on the construction, this enables a gear mechanism to be provided which enables a direction translation. Consequently, the degrees of freedom are higher when the second drive means is installed and can be even better adapted to the compactness requirements.

According to a second aspect of the invention, a numerically controlled turning machine is proposed having an work spindle for receiving a workpiece and for rotationally driving the workpiece about a spindle axis of the work spindle, and having a thread whirling device according to the first aspect described above or one of the preferred embodiments described. The turning machine preferably comprises a control device for numerically controlling the turning machine and the thread whirling device. In this instance, particular reference is made to the advantages already set out above.

The control device is preferably configured to orientate an angle between the spindle axis and the first rotation axis by controlling the second drive means. In this instance, the orientation or adjustment possibilities described below are particularly advantageous.

The control device is preferably configured to orientate an angle between the spindle axis and the first rotation axis by controlling the second drive means in order to adjust an orientation of the first rotation axis, when the machine is configured, on the basis of a theoretical thread profile which is provided. This embodiment, together with the advantages already set out, enables the adjustment to be able to be carried out in an automated manner when the turning machine is configured.

Preferably, the control device is configured to adapt an angle between the spindle axis and the first rotation axis by controlling the second drive means in order to compensate for a thread error which occurs owing to wear of cutters when the workpiece is processed. This has the advantage that significantly better levels of precision can be achieved since even cutter wear in the μm range can be compensated for, which is not possible manually. Such an improvement of the precision is highly advantageous, in particular for threads for components used in medical technology.

The control device is preferably configured to adjust an angle between the spindle axis and the first rotation axis by controlling the second drive means after forming a thread on a first workpiece and before forming a thread having the same thread profile and the same thread pitch on a second workpiece on the basis of a difference between the nominal diameters of the first and second workpiece.

The control device is preferably configured to adjust an angle between the spindle axis and the first rotation axis by controlling the second drive means after forming a thread on a first workpiece and before forming a thread having the same thread profile on a second workpiece having the same nominal diameter on the basis of a difference between the thread pitches of the thread of the first and the second workpiece. This has the advantage that, even in medical technology, conventional groups of thread portions whose thread profiles and nominal diameters are intended to be the same but are intended to have different pitches, can be produced in a particularly simple manner, extremely precisely and in a highly time-efficient manner one after the other since the adjustment of the inclination angle by the automatic control between the processing of the workpieces can be adjusted with reference to only one parameter of the difference of the pitches.

In summary, the present invention advantageously enables a thread whirling device for a turning machine and a turning machine having a thread whirling device to be provided, which enables the thread whirling of medical workplaces to be configured in a significantly more efficient and simple manner, with the high degree of precision required in medical technology being maintained or even improved, in particular when different workpieces are processed one after the other.

BRIEF DESCRIPTION OF THE FIGURES

FIG. 5 is an exemplary schematic illustration of a numerically controlled turning machine having a fitted thread whirling device according to a preferred embodiment of the present invention.

DETAILED DESCRIPTION OF PREFERRED EMBODIMENTS OF THE PRESENT INVENTION

Figure 1:
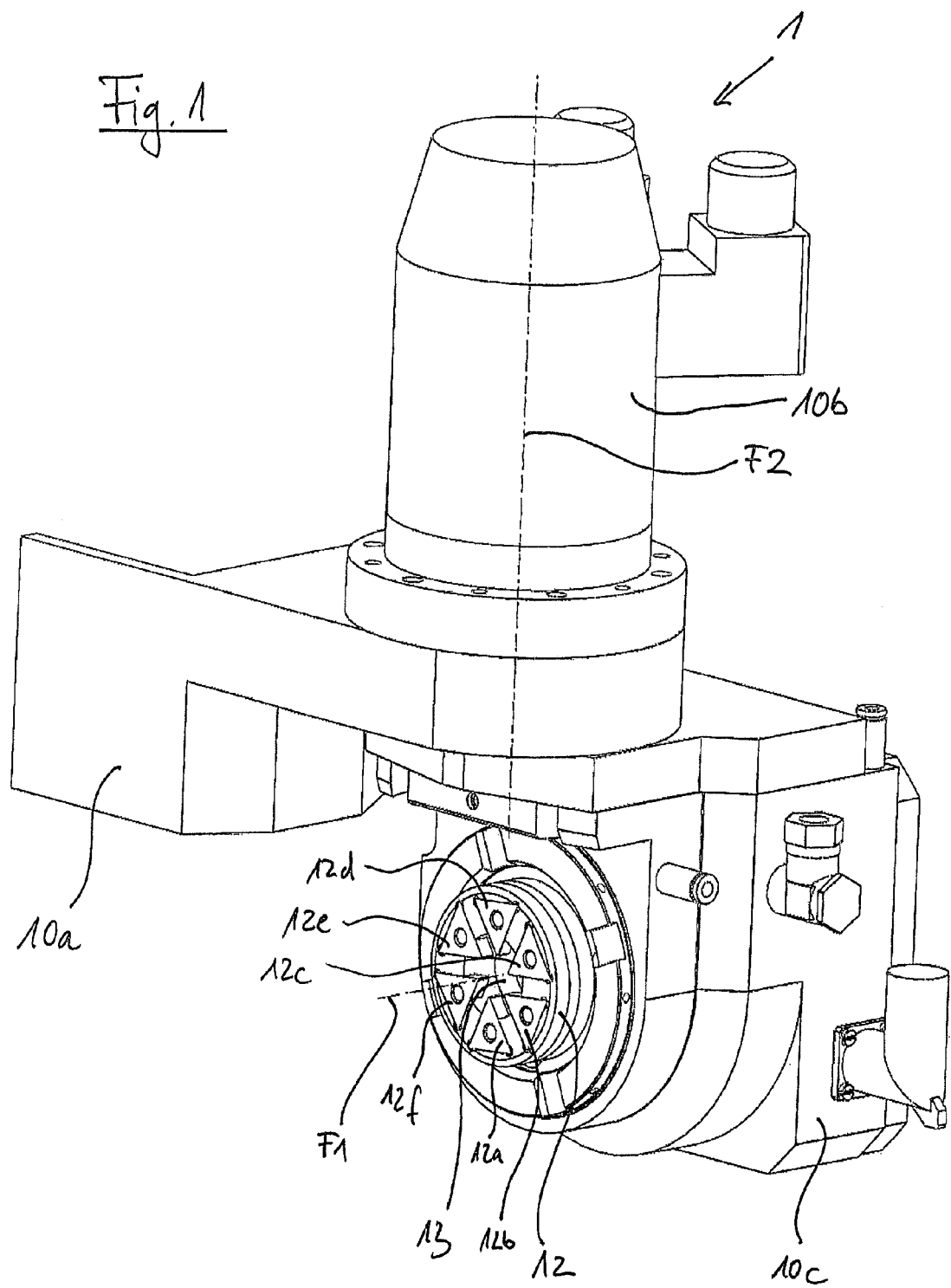
FIG. 1 is an exemplary schematic, perspective view of a thread whirling device according to a preferred embodiment of the present invention.

Preferred embodiments of the present invention are described in detail below with reference to the appended figures. However, the present invention is not limited to the embodiments described. The present invention is defined by the scope of the claims. Features of the embodiments which are the same or similar are given the same reference numerals in the figures.

FIG. 1 is an exemplary schematic, perspective view of a thread whirling device 1 according to a preferred embodiment of the present invention. The thread whirling device 1 can be fitted to a turning machine by means of a retention portion 10a of a retention structure of the thread whirling device 1, which structure further comprises a drive housing portion 10b and a whirling head retention portion 10c. There is retained on the whirling head retention portion 10c a whirling head 12 which is rotatably supported about a rotation axis F1 and which for thread whirling is driven at high speeds about the rotation axis F1 in order to produce the cutting movement.

The rotation axis F1 extends axially through a round opening 13 in the whirling head 12 at the front side of the thread whirling device 1, which for thread whirling is intended to face a spindle of the turning machine. Peripherally at the inner edge of the opening 13, a plurality of cutters 12a to 12f are arranged in a uniform manner.

Figure 2:
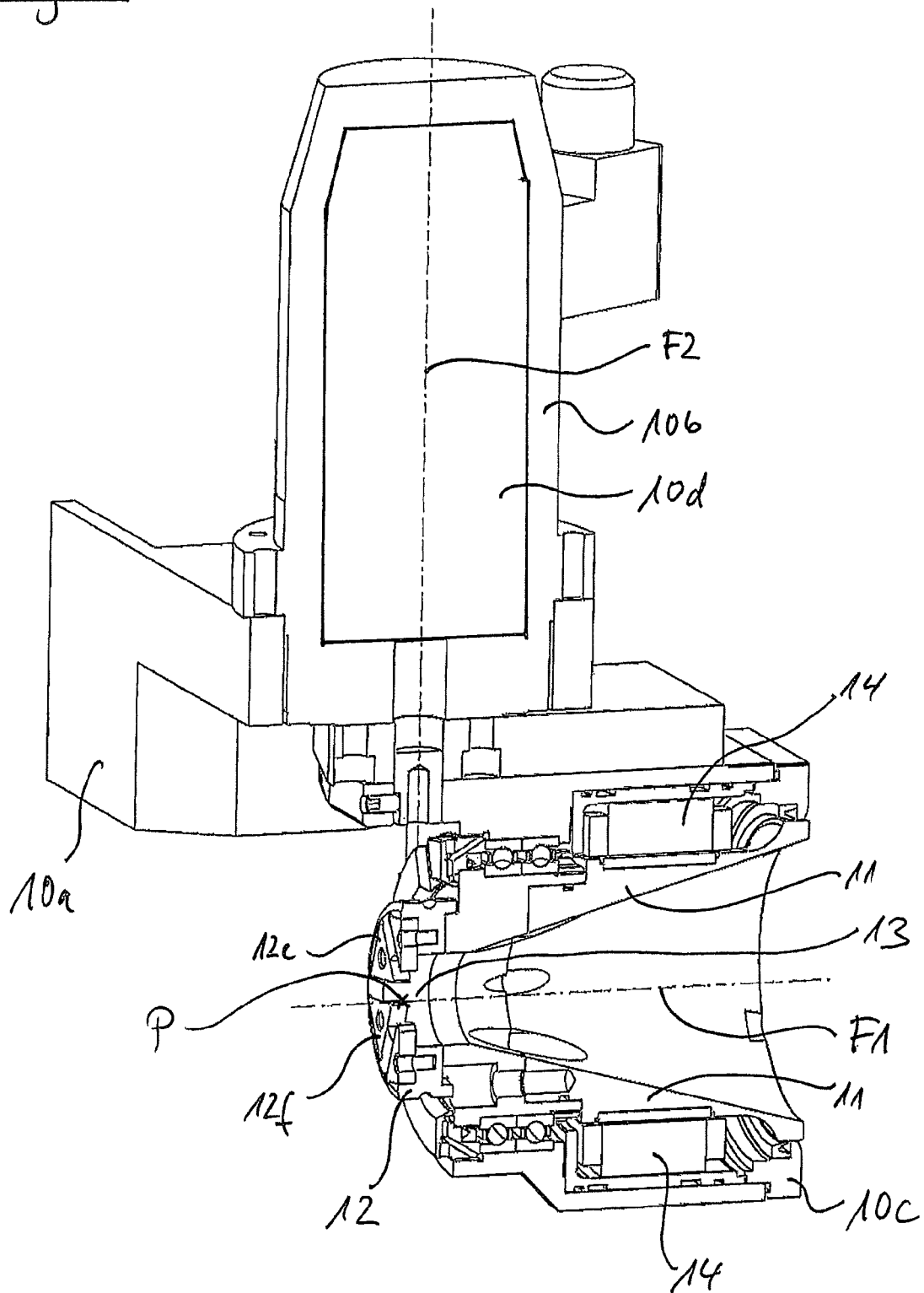
FIG. 2 is an exemplary schematic, sectional view of the thread whirling device according to FIG. 1.

FIG. 2 is an exemplary schematic, sectional view of the thread whirling device 1 according to FIG. 1. The whirling head 12 comprises a hollow conical portion 11, at the narrower end of which the opening 13 is arranged. In order to drive the whirling head about the rotation axis, a compact direct drive 14 is, for example, provided as a first drive means in the context of the invention, as taught in EP 1 985 397 A2. However, the Invention is not limited to such particularly advantageous compact direct drives for implementing the first drive means, but in other advantageous embodiments can also be driven by means of an indirect drive comprising a gear mechanism.

Figure 3:
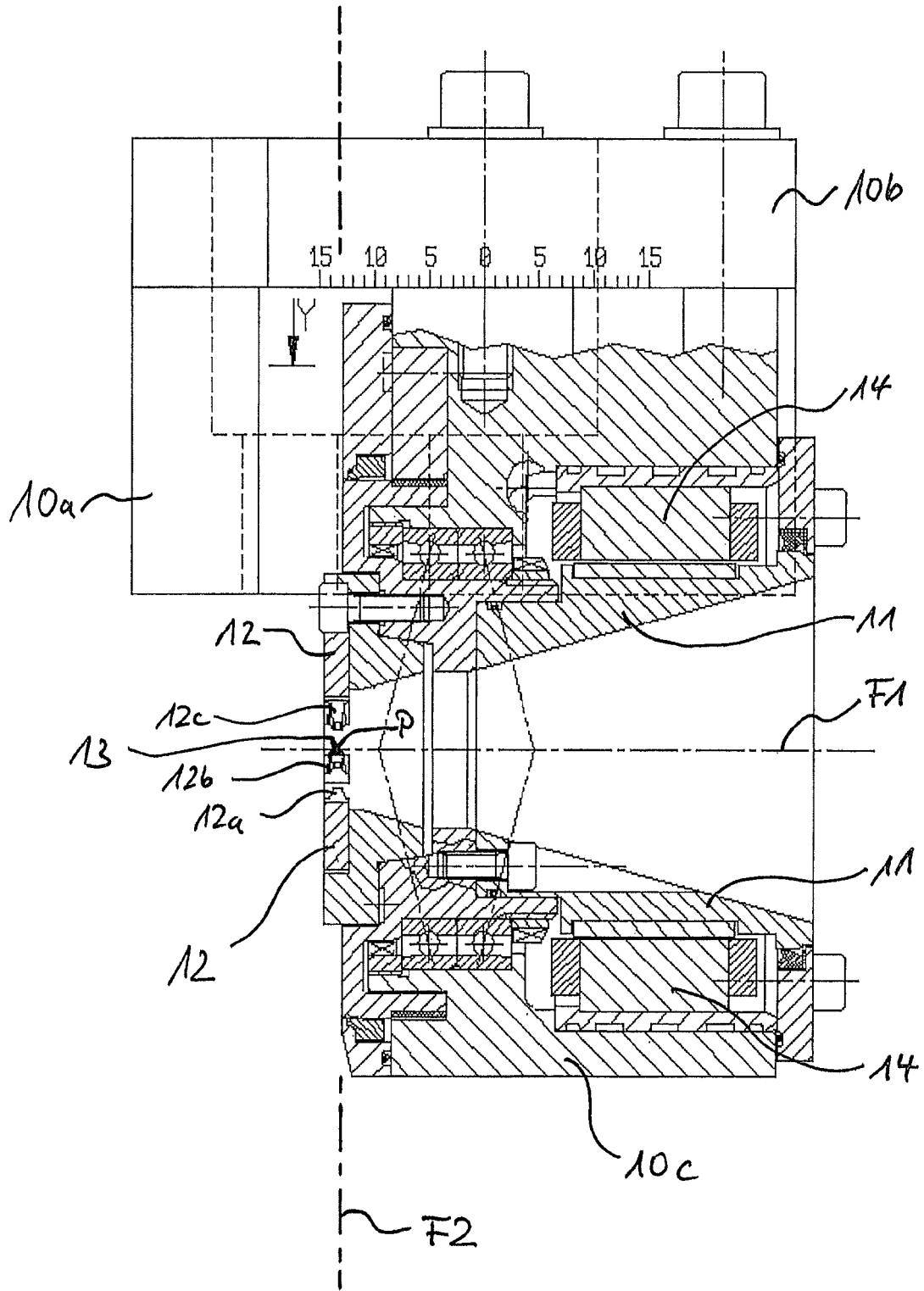
FIG. 3 is an exemplary additional schematic, sectional view of a portion of the thread whirling device according to FIG. 1, FIGS. 4A and 4B are an exemplary front view and an exemplary sectional view of a portion of a whirling head, respectively.

Inside the drive housing portion 10b there is provided a drive space 10d, in which there is provided a second drive means which is configured to rotate the whirling head 12 about a second rotation axis F2 in order to enable automatic orientation of the inclination angle of the whirling head 12 or the rotation axis F1 with respect to a spindle of the turning machine in the context of the invention. In this embodiment, the rotation axes F1 and F2 are, for example, provided in a perpendicular manner and the rotation axes in this embodiment further intersect, for example, at a common intersection P which is arranged centrally in the opening 13 and in an arrangement plane of the cutters 12a to 12f. The orientation directions of the cutters 12a to 12f are directed in particular radially inwards towards the intersection P of the rotation axes F1 and F2. This can be seen even more clearly in FIG. 3, which is another exemplary schematic, sectional view of the angled head portion of the thread whirling device 1 according to FIG. 1.

FIGS. 4A and 4B are an exemplary front view and an exemplary sectional view of a portion of a whirling head during a thread whirling operation, respectively. In this instance, there are provided for example only three cutters 12a to 12c, only one (in this instance cutter 12a) carrying out a cut on the workpiece W at any one time when it is inserted into the opening 13 in a slightly offset manner with respect to the axial point P between the cutters at which the rotation axes F1 and F2 intersect.

The arrows RS distinguish a tool rotation movement about the spindle axis S (driven by the non-illustrated spindle of the turning machine) and the arrows R1 distinguish the rotation movement of the whirling head 12 with the cutters about the rotation axis F1 in order to produce the cutting movement. For example, the rotation directions are the same in this instance, but RS and R1 may also be provided so as to be in opposite directions. As already mentioned, a cutting movement is produced by the rotation movement R1 about the rotation axis F1 and the rotation movement RS of the tool about the spindle axis produces the thread when the workpiece W is moved at the same time and relative to the whirling head 12 in the direction of the spindle axis S. In this instance, the relative movement between the spindle and whirling head 12 in the direction of the spindle axis, and in particular the relative feed speed, are the significant aspects, but it is not significant whether the spindle is retained and the whirling head 12 or the thread whirling device 1 is moved, or whether the spindle itself is moved.

FIG. 5 is an exemplary schematic illustration of a numerically controlled turning machine 100 having a fitted thread whirling device 1 according to a preferred embodiment of the present invention. The turning machine 100 comprises an work spindle 101, which retains a tool W and can drive it in a rotational manner about the spindle axis. Furthermore, the turning machine 100 comprises a control device 102 having a numerical control 102a (NC) and a programmable logic controller (PLC), the control device 102 numerically controlling the spindle 101 via the connection 105a.

In addition, in order to produce the feed movement, there is provided a sliding member 103 of a linear axis which is supported so as to be able to be moved in a Z direction (for example, in parallel with the spindle axis), the feed motion of the sliding member 103 being controlled by the control device 102 via the connection 105b. The thread whirling device 1 is fitted to the sliding member 103 and can consequently be moved by means of the sliding member relative to the spindle 101 in the direction of the spindle axis. Alternatively or additionally, it would naturally be possible to provide a movable spindle stock for moving the spindle relative to the thread whirling device.

In addition to the whirling head 12, for a more precise description of which reference may be made to the above descriptions, the thread whirling device comprises a first drive means 14 (for example, having a direct drive or an indirect drive including a gear mechanism) for driving the whirling head 12 about the first rotation axis F1 in order to produce the cutting movement (that is to say, at high speeds, for example approximately from 1500 to 300 rotations per minute) and a second drive means 15 for rotating the whirling head 12 about the second rotation axis F2 in order to adjust the inclination angle of the whirling head 12. In contrast to the high-speed drive 14, the second drive means is configured for significantly lower rotation speeds and preferably comprises a servomotor which can be controlled in a precise manner and a position sensor (for example, incremental sensor) for adjusting the servomotor.

According to this embodiment, the thread whirling device 1 further comprises an interface means 16 which can be connected to the control device 102 by means of the connection 2, interface means 104 of the turning machine 100 and the connection 105c so that the thread whirling device 1 and in particular the drive means 14 and 15 can be controlled in an open-loop manner by means of the control device 102 of the turning machine 100 or, in the case of the drive means 15, can preferably even be controlled in a closed-loop manner. This can be carried out either by means of manual input by a user on the control device and/or even in a fully automated manner by means of control data, such as, for example, an NC programme.

In conclusion, the present invention advantageously enables the provision of a thread whirling device for a turning machine and a turning machine having a thread whirling device which enables the thread whirling of medical workpieces to be configured in a significantly more efficient and simpler manner, with the high degree of precision required in medical technology being maintained or even improved, in particular when different workpieces are processed one after the other.

The invention claimed is:

1. Thread whirling device for producing a thread on a workpiece on a numerically controlled turning machine by means of a thread whirling method, having:
   a retention structure for fitting the thread whirling device to the turning machine,
   a whirling head which is retained on the retention structure, has an opening and carries one or more cutters which are arranged peripherally on the edge of the opening, and
   a first drive means which is configured to drive the whirling head in a rotational manner about a first rotation axis which extends through the opening;
   the thread whirling device being configured to carry out the thread whirling method, in which:
      the workpiece is driven in a rotational manner about the spindle axis of an work spindle by means of the work spindle of the turning machine, whilst the workpiece extends through the opening of the whirling head,
      the whirling head, in order to produce a cutting movement, is driven rotationally about the first rotation axis by means of the first drive means, and
      the workpiece is controlled by means of a control device of the turning machine in such a manner that it moves relative to the whirling head in the direction of the spindle axis, the feed speed of the workpiece relative to the whirling head in the direction of the spindle axis and the rotation speed of the workpiece about the spindle axis being adjusted with respect to each other in accordance with the thread to be formed, including
a second drive means which is configured to drive the whirling head in a rotational manner about a second rotation axis which extends transversely relative to the first rotation axis, in order to orientate an angle between the first rotation axis and the spindle axis when the thread whirling device is fitted to the turning machine.

2. Thread whirling device according to claim 1, wherein the second rotation axis extends substantially perpendicularly relative to the first rotation axis.

3. Thread whirling device according to claim 1, wherein the first rotation axis and the second rotation axis intersect at a common intersection.

4. Thread whirling device according to claim 3, wherein the one or more cutters of the whirling head have a cutting orientation which is orientated for each of the cutters with the common intersection of the first rotation axis and the second rotation axis.

5. Thread whirling device according to claim 1, including an interface means which is configured to be connected to the control device of the turning machine, the second drive means being configured to be controlled by the control device of the turning machine by means of the connected interface means.

6. Thread whirling device according to claim 1, including an interface means which is configured to be connected to an electronic control device, the second drive means being configured to be controlled by the electronic control device by means of the connected interface means.

7. Thread whirling device according to claim 1, including an electronic control device, the second drive means being configured to be controlled by means of the electronic control device.

8. Thread whirling device according to claim 7, wherein the electronic control device of the thread whirling device comprises an interface means which is configured to be connected to the control device of the turning machine.

9. Thread whirling device according to claim 5, wherein the second drive means is configured to be controlled by means of the control device which controls it on the basis of a manual input by a user and/or on the basis of control commands contained in a CNC programme.

10. Thread whirling device according to claim 1, wherein the second drive means comprises, for rotatably driving the whirling head about the second rotation axis, an electric motor, in particular a servomotor.

11. Thread whirling device according to claim 1, wherein the second drive means comprises a clamping means which is configured to secure the angle orientated by means of the second drive means between the first rotation axis and the spindle axis during the thread whirling method.

12. Thread whirling device according to claim 1, wherein the second drive means comprises an angular position sensor which is configured to establish an angular position of an orientation of the whirling head with respect to the rotation about the second rotation axis.

13. Thread whirling device according to claim 12, including an interface means which is configured to be connected to the control device of the turning machine, the second drive means being configured to be controlled by the control device of the turning machine by means of the connected interface means, wherein the angular position sensor is configured for an adjustment of the second drive means to transmit an output signal which indicates the established angular position to the control device which controls the second drive means.

14. Thread whirling device according to claim 1, wherein the second drive means is configured to orientate the whirling head from a standard orientation up to a first maximum angular orientation in a first rotation direction about the second rotation axis, and from the standard orientation up to a second maximum angular orientation in a second rotation direction counter to the first rotation direction about the second rotation axis, in particular up to +15° and −15° with respect to the standard orientation.

15. Thread whirling device according to claim 14, wherein the thread whirling device can be fitted to the turning machine in such a manner that the first rotation axis with standard orientation of the whirling head is orientated parallel to, in particular coaxial with, the spindle axis of the turning machine.

16. Thread whirling device according to claim 1, wherein the second drive means comprises a gear mechanism.

17. Thread whirling device according to claim 16, wherein the gear mechanism comprises a bevel gear mechanism, a worm gear mechanism and/or a spur gear mechanism.

18. Numerically controlled turning machine having:
an work spindle for receiving a workpiece and for rotationally driving the workpiece about a spindle axis of the work spindle, and
a thread whirling device according to claim 1.

19. Turning machine according to claim 18, including a control device for numerically controlling the turning machine and the thread whirling device.

20. Turning machine according to claim 19, wherein the control device is configured to orientate an angle between the spindle axis and the first rotation axis by controlling the second drive means.

21. Turning machine according to claim 20, wherein the control device is configured to orientate an angle between the spindle axis and the first rotation axis by controlling the second drive means in order to adjust an orientation of the first rotation axis, when the machine is configured, on the basis of a theoretical thread profile which is provided.

22. Turning machine according to claim 20, wherein the control device is configured to adapt an angle between the spindle axis and the first rotation axis by controlling the second drive means in order to compensate for a thread error which occurs owing to wear of cutters when the workpiece is processed.

23. Turning machine according to claim 20, wherein the control device is configured to adjust an angle between the spindle axis and the first rotation axis by controlling the second drive means after forming a thread on a first workpiece and before forming a thread having the same thread profile and the same thread pitch on a second workpiece on the basis of a difference between the nominal diameters of the first and second workpiece.

24. Turning machine according to claim 20, wherein the control device is configured to adjust an angle between the spindle axis and the first rotation axis by controlling the second drive means after forming a thread on a first workpiece and before forming a thread having the same thread profile on a second workpiece having the same nominal diameter on the basis of a difference between the thread pitches of the thread of the first and the second workpiece.

* * * * *